United States Patent
Smith et al.

(10) Patent No.: US 10,260,547 B2
(45) Date of Patent: Apr. 16, 2019

(54) LOCKBOLT FASTENING SYSTEM

(71) Applicant: Arconic Inc., Pittsburgh, PA (US)

(72) Inventors: James T. Smith, Crawford, TX (US); Robert J. Corbett, Woodway, TX (US)

(73) Assignee: Arconic Inc., Pittsburgh, PA (US)

( * ) Notice: Subject to any disclaimer, the term of this patent is extended or adjusted under 35 U.S.C. 154(b) by 129 days.

(21) Appl. No.: 15/478,785

(22) Filed: Apr. 4, 2017

(65) Prior Publication Data

US 2017/0284442 A1  Oct. 5, 2017

Related U.S. Application Data

(60) Provisional application No. 62/318,329, filed on Apr. 5, 2016.

(51) Int. Cl.
| | | |
|---|---|---|
| *F16B 19/05* | (2006.01) | |
| *B21J 15/02* | (2006.01) | |
| *F16B 5/04* | (2006.01) | |

(52) U.S. Cl.
CPC ............. *F16B 19/05* (2013.01); *B21J 15/022* (2013.01); *F16B 5/04* (2013.01)

(58) Field of Classification Search
CPC ............................ F16B 19/05; F16B 39/026
USPC ......................................................... 411/361
See application file for complete search history.

(56) References Cited

U.S. PATENT DOCUMENTS

| | | | |
|---|---|---|---|
| 2,531,048 A | 11/1950 | Huck | |
| 2,531,049 A | 11/1950 | Huck | |
| 2,764,045 A | 9/1956 | Koenig | |
| 2,955,505 A * | 10/1960 | Schuster | ................ F16B 19/05 29/520 |
| 3,029,665 A | 4/1962 | Bough et al. | |
| 3,215,024 A | 11/1965 | Brilmyer et al. | |
| 3,792,933 A | 2/1974 | Stencel | |
| 3,915,053 A | 10/1975 | Ruhl | |
| 4,299,519 A | 11/1981 | Corbett | |
| 4,447,077 A | 5/1984 | Palmer | |
| 4,472,096 A | 9/1984 | Ruhl et al. | |
| 4,531,871 A | 7/1985 | Sigmund | |

(Continued)

FOREIGN PATENT DOCUMENTS

| | | |
|---|---|---|
| AU | 2006203501 B2 | 6/2010 |
| CA | 2555830 | 2/2010 |

(Continued)

OTHER PUBLICATIONS

International Search Report and Written Opinion dated Jul. 17, 2017, issued by the European Patent Office in International Application No. PCT/US2017/025927 (16 pages).

*Primary Examiner* — Flemming Saether
(74) *Attorney, Agent, or Firm* — Greenberg Traurig, LLP

(57) ABSTRACT

A swage collar includes a shank, a flange, and a through bore. The shank includes a first end, a second end opposite the first end, an outside diameter, and an overall length between the first end and the second end. The flange extends from the first end of the shank. The through bore extends longitudinally through the shank from the first end of the shank to the second end of the shank. The through bore defines an inside diameter. The inside diameter and the outside diameter together define a wall thickness of the shank. The wall thickness of the shank is in a range of about 0.1 times the overall length of the shank to about 0.16 times the overall length of the shank.

15 Claims, 5 Drawing Sheets

(56) References Cited

U.S. PATENT DOCUMENTS

| | | |
|---|---|---|
| 4,597,263 A | 7/1986 | Corbett |
| 4,813,834 A | 3/1989 | Smith |
| 4,867,625 A | 9/1989 | Dixon |
| 4,878,372 A | 11/1989 | Port et al. |
| 4,921,384 A | 5/1990 | Nordyke |
| 4,943,196 A | 7/1990 | Dahl |
| 4,995,777 A | 2/1991 | Warmington |
| 5,049,016 A | 9/1991 | Nordyke |
| 5,064,968 A | 11/1991 | Kovacs et al. |
| 5,090,852 A | 2/1992 | Dixon |
| 5,125,778 A | 6/1992 | Sadri |
| 5,315,755 A | 5/1994 | Fulbright et al. |
| 5,548,889 A | 8/1996 | Smith et al. |
| 6,233,802 B1 | 5/2001 | Fulbright |
| 6,325,582 B1 | 12/2001 | Sadri et al. |
| 6,497,024 B2 | 12/2002 | Fulbright |
| 6,702,684 B2 | 3/2004 | Harbin et al. |
| 7,025,550 B2 * | 4/2006 | Monserratt ............ B21J 15/022 411/307 |
| 7,195,438 B2 | 3/2007 | Harbin et al. |
| 7,293,339 B2 | 11/2007 | Mercer et al. |
| 7,597,517 B2 * | 10/2009 | Beeles .................... F16B 19/05 29/243.529 |
| 7,891,924 B2 | 2/2011 | Mercer et al. |
| 8,621,734 B2 | 1/2014 | Mercer et al. |
| 8,727,685 B2 | 5/2014 | Corbett |
| 8,794,890 B2 * | 8/2014 | Pinheiro ................. F16B 19/05 411/361 |
| 9,194,412 B2 * | 11/2015 | Haines, Jr. .............. F16B 19/05 |
| 2007/0003393 A1 | 1/2007 | Mercer et al. |
| 2008/0247841 A1 | 10/2008 | Mercer et al. |
| 2009/0053006 A1 | 2/2009 | Hufnagl et al. |
| 2015/0078859 A1 | 3/2015 | Haines, Jr. |

FOREIGN PATENT DOCUMENTS

| | | |
|---|---|---|
| CN | 101360920 A | 2/2009 |
| CN | 101912941 A | 12/2010 |
| CN | 204458745 U | 7/2015 |
| EP | 0122685 A1 | 10/1984 |
| EP | 2078165 | 10/2016 |
| IN | 269954 | 11/2006 |
| JP | 5393469 | 10/2013 |
| RU | 2409771 C2 | 12/2009 |
| SU | 1097837 A1 | 6/1984 |
| WO | 0111248 A1 | 2/2001 |
| WO | 2015116444 A1 | 8/2015 |

* cited by examiner

LOCKBOLT FASTENING SYSTEM

CROSS-REFERENCE TO RELATED APPLICATION

This application is a Section 111(a) application relating to and claiming the benefit of commonly-owned, U.S. Provisional Patent Application Ser. No. 62/318,329, filed Apr. 5, 2016, entitled "LOCKBOLT SYSTEM WITH OPTIMIZED CLAMP AND TENSILE STRENGTH," the contents of which are incorporated herein by reference in their entirety.

FIELD OF THE INVENTION

The present invention relates to fasteners and, more particularly, a lockbolt fastening system including a pin member and a swage collar adapted to be swaged onto the pin member.

BACKGROUND OF THE INVENTION

Two-piece swaged fasteners, commonly referred to as lockbolts, are used to secure a plurality of workpieces together. Typically, swage-type fasteners include a pin member having lock grooves and a swage collar adapted to be swaged into the lock grooves of the pin member by a fastener installation tool. Once installed, a swage-type fastener should provide a high tensile strength and a high clamp load on a plurality of workpieces secured together thereby.

SUMMARY OF THE INVENTION

In an embodiment, a swage collar includes a shank, a flange, and a through bore, the shank including a first end, a second end opposite the first end, an outside diameter, and an overall length between the first end and the second end, the flange extending from the first end of the shank, the through bore extending longitudinally through the shank from the first end of the shank to the second end of the shank, the through bore defining an inside diameter, the inside diameter and the outside diameter together defining a wall thickness of the shank, the wall thickness of the shank being in a range of about 0.1 times the overall length of the shank to about 0.16 times the overall length of the shank.

In an embodiment, the wall thickness of the shank is a range of about 0.13 times the overall length of the shank to about 0.14 times the overall length of the shank. In an embodiment, the swage collar is made from either low-carbon steel or medium-carbon steel. In an embodiment, the swage collar is as-headed. In an embodiment, the swage collar is thermally processed. In an embodiment, the swage collar also includes an internal fit-up tab.

In an embodiment, a swage collar includes a shank, a flange, and a through bore, the shank having a first end, a second end opposite the first end, an outside diameter, and an overall length between the first end and the second end of the shank, the flange extending from the first end of the shank to a flange endpoint that is located intermediate the first end of the shank and the second end of the shank, the flange endpoint defining a swage length of the shank between the flange endpoint and the second end of the shank, the through bore extending longitudinally through the shank from the first end of the shank to the second end of the shank, the through bore defining an inside diameter, the inside diameter and the outside diameter together defining a wall thickness of the shank, the swage length of the shank being in a range of about 5 times the wall thickness of the shank to about 7.5 times the wall thickness of the shank. In an embodiment, the swage length of the shank is in a range of about 6.0 times the wall thickness of the shank to about 7.0 times the wall thickness of the shank. In an embodiment, the swage length of the shank is a range of from about 6.25 times the wall thickness of the shank to about 6.67 times the wall thickness of the shank. In an embodiment, the swage collar is made from either low-carbon steel or medium-carbon steel. In an embodiment, the swage collar is as-headed. In an embodiment, the swage collar is thermally processed. In an embodiment, the swage collar also includes an internal fit-up tab.

In an embodiment, a fastener includes a pin member and a swage collar, the pin member having an elongated shank portion having a first end and a second end opposite the first end, a head at the first end, a pull portion at the second end, and a plurality of lock grooves intermediate the first and second ends of the shank portion, the swage collar including a shank, a flange, and a through bore, the shank having a first end, a second end opposite the first end of the shank of the swage collar, an outside diameter, and an overall length between the first end of the shank of the swage collar and the second end of the shank of the swage collar, the flange extending from the first end of the shank of the swage collar to a flange endpoint intermediate the first and second ends of the shank of the swage collar, the flange endpoint defining a swage length of the shank of the swage collar between the flange endpoint and the second end of the shank of the swage collar, the through bore extending longitudinally through the shank of the swage collar from the first end of the shank of the swage collar to the second end of the shank of the swage collar, the through bore defining an inside diameter, the inside diameter and the outside diameter together defining a wall thickness of the shank of the swage collar, the swage length of the shank of the swage collar being in a range of about 5 times the wall thickness of the shank of the swage collar to about 7.5 times the wall thickness of the shank of the swage collar.

In an embodiment, the swage length of the shank of the swage collar is in a range of about 6.3 times the wall thickness of the shank of the swage collar to about 6.6 times the wall thickness of the shank of the swage collar. In an embodiment, the shank portion of the pin member includes a threaded portion having a plurality of threads, and wherein the lock grooves are formed by the plurality of threads. In an embodiment, the pin member is a Class 10.9 strength level bolt. In an embodiment, the swage collar is made from either low-carbon steel or medium-carbon steel. In an embodiment, the swage collar is as-headed. In an embodiment, the swage collar is thermally processed.

DETAILED DESCRIPTION OF THE DRAWINGS

Figure 1:
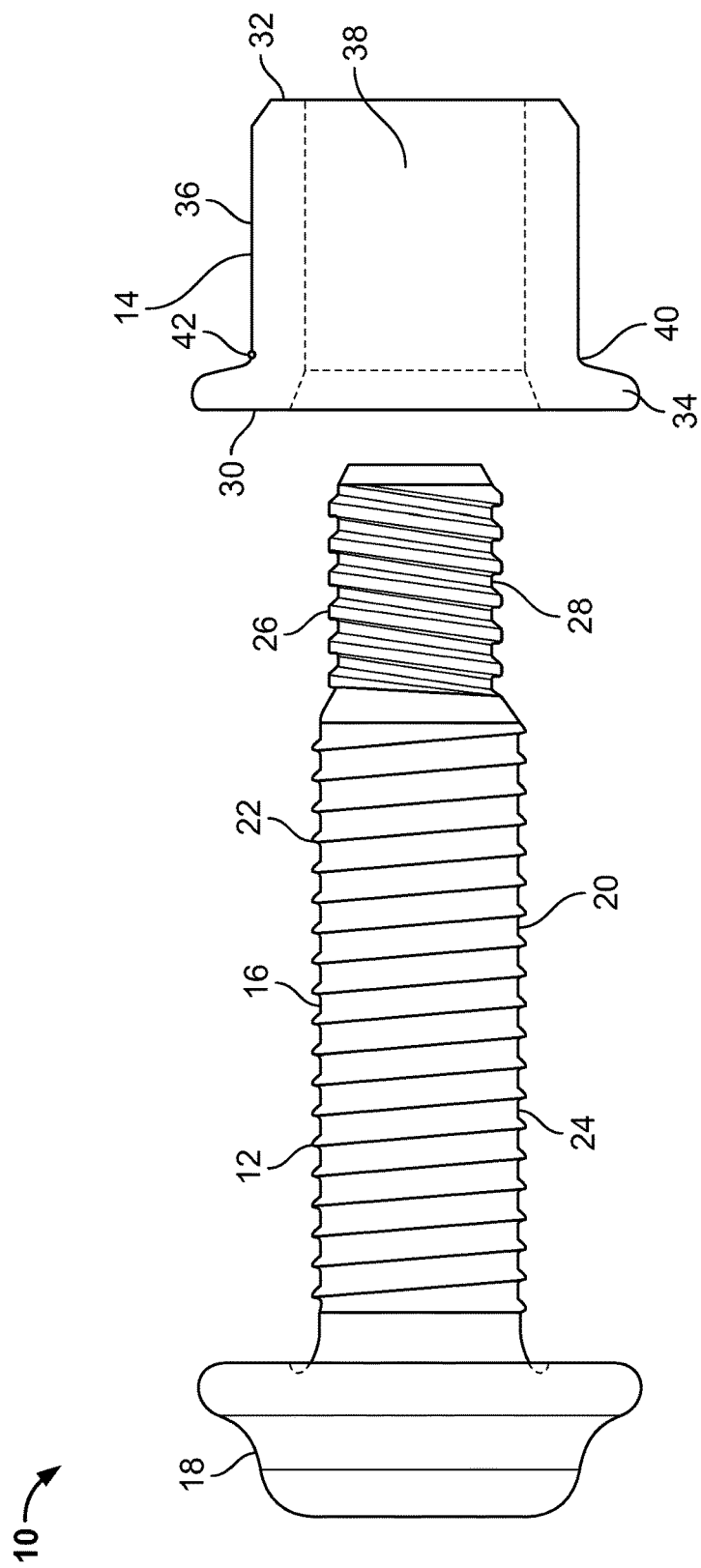
FIG. 1 is a side elevational view of a swage-type lockbolt fastening system constructed in accordance with an embodiment of the present invention.

Referring to FIG. 1, in an embodiment, a fastener 10 includes a pin member 12 and a swage collar 14 that is sized and shaped to mate with and be swaged onto the pin member 12. In an embodiment, the pin member 12 includes an elongated shank portion 16 which terminates at one end in a head 18. In an embodiment, the shank portion 16 includes a threaded portion 20 having a plurality of threads 22 with lock grooves 24 formed between the threads 22. In an embodiment, the threaded portion 20 includes a single thread 22. In another embodiment, the threaded portion 20 includes at least one lock groove 24. In another embodiment, the threaded portion includes a single lock grove 24. In an embodiment, the shank portion 16 includes a pull portion 26 having a plurality of pull grooves 28. In an embodiment, the pull grooves 28 are helical grooves. In another embodiment, the pull grooves 28 are annular grooves. In an embodiment, the pull grooves 28 are formed perpendicular to a longitudinal axis of the pin member 12. In another embodiment, the pull grooves 28 are formed obliquely to the longitudinal axis of the pin member 12. In an embodiment, the pull grooves 28 are formed obliquely to the longitudinal axis of the pin member 12 and in an angular direction opposite to that of the threads 22 of the threaded portion 20. In an embodiment, the pull grooves 28 are formed obliquely to the longitudinal axis of the pin member 12 and in an angular direction the same or substantially the same as that of the threads 22 of the threaded portion 20. In another embodiment, the pull portion 26 includes at least one pull groove 28. In another embodiment, the pull portion includes a single pull groove 28. In an embodiment, the pin member 12 is made from medium carbon alloy steel. In an embodiment, the pin member 12 is a Class 10.9 strength level bolt. In other embodiments, the bolt 12 can be characterized by any grade known in the art, such as, for example, Grade 2, Grade 5, Grade 8, Class 8.8, and Class 10.9. In other embodiments, the pin member 12 may be made from other suitable materials known in the art.

Still referring to FIG. 1, in an embodiment, the swage collar 14 includes a first end 30 and a second end 32 opposite the first end 30. The swage collar 14 includes a circumferentially extending flange 34 at the first end 30 and a tubular-shaped shank 36 extending from the flange 34 to the second end 32 of the swage collar 14. A through bore 38 extends from the first end 30 to the second end 32. In an embodiment, the shank 36 includes a generally uniform, cylindrical configuration. In an embodiment, the swage collar 14 includes a curved transition area 40 between the shank 36 and the flange 34. In an embodiment, the swage collar 14 may include an internal fit-up tab (not shown in the Figures). In another embodiment, the swage collar 14 may lack an internal fit-up tab.

In an embodiment, a point 42 is located where the shank 36 meets the curved transition area 40. It will be apparent to those of skill in the art that the point 42 is merely a reference point discussed herein for the purpose of enabling a full description of the swage collar 14, and is not a physical element of the swage collar 14. It will also be apparent to those of skill in the art that the point 42 is not located at any specific point around the circumference of the cylindrical shank 36, but may be located at any point around the circumference of the cylindrical shank 36 at the axial location described above (i.e., where the shank 36 meets the curved transition area 40). The point 42 may alternately be referred to as a flange endpoint of the flange 34.

It will be apparent to those of skill in the art that pin members and corresponding swage collars (e.g., the pin member 12 and the swage collar 14) may be produced in a variety of sizes appropriate for installation in correspondingly sized aligned holes within a plurality of workpieces in order to secure together such workpieces.

Figure 2:
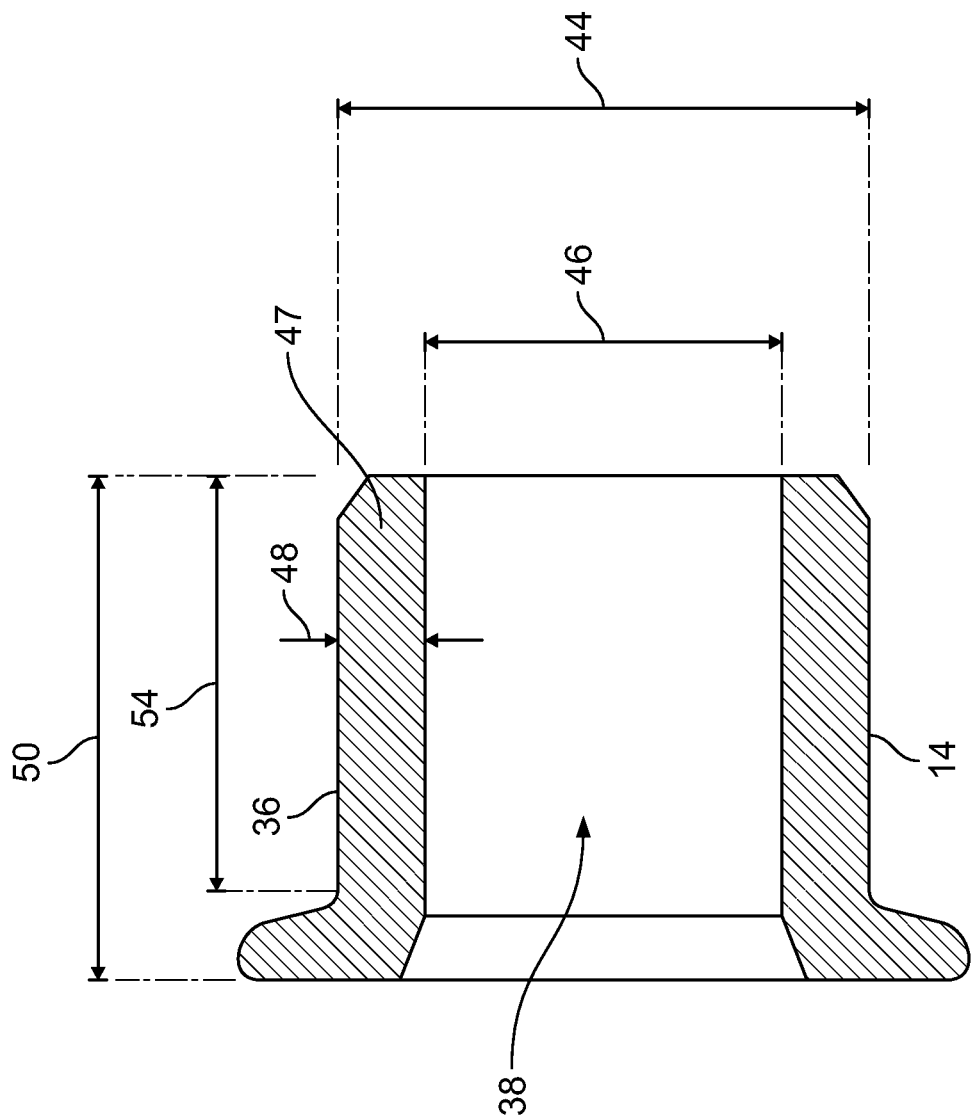
FIG. 2 is a side cross-sectional view of a swage collar employed by the lockbolt fastening system shown in FIG. 1.

FIG. 2 illustrates a cross-sectional view of the swage collar 14. The shank 36 has an outside diameter 44. The through bore 38 defines an inside diameter 46. A wall 47 having a wall thickness 48 is formed by the through bore 38. The swage collar 14 has an overall length 50 between the first end 32 and the second end 34. The swage collar 14 has a nominal size. In an embodiment, the swage collar 14 includes a swage length 54 that is the length from the point 42 to the second end 32. In an embodiment, the above-noted measurements for various sizes of the swage collar 14 are as shown in the following table:

| Nominal Size | Overall Length 50 | Swage Length 54 | Inside Diameter 46 | Outside Diameter 44 | Wall Thickness 48 |
|---|---|---|---|---|---|
| 12 mm | 22.4 mm | 19.8 mm | 12.2 mm | 18.4 mm | 3.1 mm |
| 16 mm | 29.8 mm | 26.4 mm | 16.2 mm | 24.3 mm | 4.1 mm |
| 20 mm | 37.3 mm | 33.0 mm | 20.3 mm | 30.4 mm | 5.1 mm |

In each of the above-noted sizes of the swage collar 14, the wall thickness 48 is in a range from about 0.1 to 0.4 times the inside diameter 46. In an embodiment, the wall thickness 48 is in a range from about 0.1 to about 0.35 times the inside diameter 46. In an embodiment, the wall thickness 48 is in a range from about 0.1 to about 0.3 times the inside diameter 46. In an embodiment, the wall thickness 48 is in a range from about 0.1 to about 0.26 times the inside diameter 46. In an embodiment, the wall thickness 48 is in a range from about 0.15 to about 0.4 times the inside diameter 46. In an embodiment, the wall thickness 48 is in a range from about 0.15 to about 0.35 times the inside diameter 46. In an embodiment, the wall thickness 48 is in a range from about 0.15 to about 0.3 times the inside diameter 46. In an embodiment, the wall thickness 48 is in a range from about 0.15 to about 0.26 times the inside diameter 46. In an embodiment, the wall thickness 48 is in a range from about 0.2 to about 0.4 times the inside diameter 46. In an embodiment, the wall thickness 48 is in a range from about 0.2 to about 0.35 times the inside diameter 46. In an embodiment, the wall thickness 48 is in a range from about 0.2 to about 0.3 times the inside diameter 46. In an embodiment, the wall thickness 48 is in a range from about 0.2 to about 0.26 times the inside diameter 46. In an embodiment, the wall thickness 48 is in a range from about 0.24 to about 0.4 times the inside diameter 46. In an embodiment, the wall thickness 48 is in a range from about 0.24 to about 0.35 times the inside diameter 46. In an embodiment, the wall thickness 48 is in a range from about 0.24 to about 0.3 times the inside diameter 46. In an embodiment, the wall thickness 48 is in a range from about 0.24 to about 0.26 times the inside diameter 46.

In each of the above-noted sizes of the exemplary collar 14, the wall thickness 48 is in a range from about 0.1 to about 0.2 times the overall length 50. In an embodiment, the wall thickness 48 is in a range from about 0.1 to about 0.16 times the overall length 50. In an embodiment, the wall thickness 48 is in a range from about 0.1 to about 0.15 times the overall length 50. In an embodiment, the wall thickness 48 is in a range from about 0.1 to about 0.14 times the overall length 50. In an embodiment, the wall thickness 48 is in a range from about 0.11 to about 0.16 times the overall length 50. In an embodiment, the wall thickness 48 is in a range from about 0.11 to about 0.15 times the overall length 50. In an embodiment, the wall thickness 48 is in a range from about 0.11 to about 0.14 times the overall length 50. In an embodiment, the wall thickness 48 is in a range from about 0.12 to about 0.16 times the overall length 50. In an embodiment, the wall thickness 48 is in a range from about 0.12 to about 0.15 times the overall length 50. In an embodiment, the wall thickness 48 is in a range from about 0.12 to about 0.14 times the overall length 50. In an embodiment, the wall thickness 48 is in a range from about 0.13 to about 0.16 times the overall length 50. In an embodiment, the wall thickness 48 is in a range from about 0.13 to about 0.15 times the overall length 50. In an embodiment, the wall thickness 48 is in a range from about 0.13 to about 0.14 times the overall length 50. In an embodiment, the wall thickness 48 is in a range from about 0.13 to about 0.15 times the overall length 50. In an embodiment, the wall thickness 48 is in a range from about 0.135 to about 0.14 times the overall length 50.

In each of the above-noted sizes of the exemplary collar 14, the swage length 54 is in a range from about 5.0 to 7.5 times the wall thickness 48. In an embodiment, the swage length 54 is in a range from about 5.0 to 7.0 times the wall thickness 48. In an embodiment, the swage length 54 is in a range from about 5.0 to 6.5 times the wall thickness 48. In an embodiment, the swage length 54 is in a range from about 5.5 to 7.5 times the wall thickness 48. In an embodiment, the swage length 54 is in a range from about 5.5 to 7.0 times the wall thickness 48. In an embodiment, the swage length 54 is in a range from about 5.5 to 6.5 times the wall thickness 48. In an embodiment, the swage length 54 is in a range from about 6.0 to 7.5 times the wall thickness 48. In an embodiment, the swage length 54 is in a range from about 6.0 to 7.0 times the wall thickness 48. In an embodiment, the swage length 54 is in a range from about 6.0 to 6.7 times the wall thickness 48. In an embodiment, the swage length 54 is in a range from about 6.0 to 6.5 times the wall thickness 48. In an embodiment, the swage length 54 is in a range from about 6.3 to 7.5 times the wall thickness 48. In an embodiment, the swage length 54 is in a range from about 6.3 to 7.0 times the wall thickness 48. In an embodiment, the swage length 54 is in a range from about 6.3 to 6.6 times the wall thickness 48. In an embodiment, the swage length 54 is a range from about 6.25 to 6.67 times the wall thickness 48.

In an embodiment, the swage collar 14 is made of low carbon steel. In another embodiment, the swage collar 14 is made from unannealed low carbon steel. In another embodiment, the swage collar 14 is made from annealed low carbon steel. In another embodiment, the swage collar 14 is made from medium carbon steel. In another embodiment, the swage collar 14 is made from medium carbon steel that has been thermally processed. In another embodiment, the swage collar 14 is "as-headed" and does not require thermal processing. As employed herein, the term "as-headed" refers to a collar which is strain hardened, for example, from cold working, rather than changing hardness using a thermal process (e.g., quench and tempering; stress relieving; etc.). In another embodiment, the swage collar 14 is thermally processed. In an embodiment, the thermal processing of the swage collar 14 includes quench and tempering. In an embodiment, the thermal processing of the swage collar 14 includes stress relieving.

Figure 3:
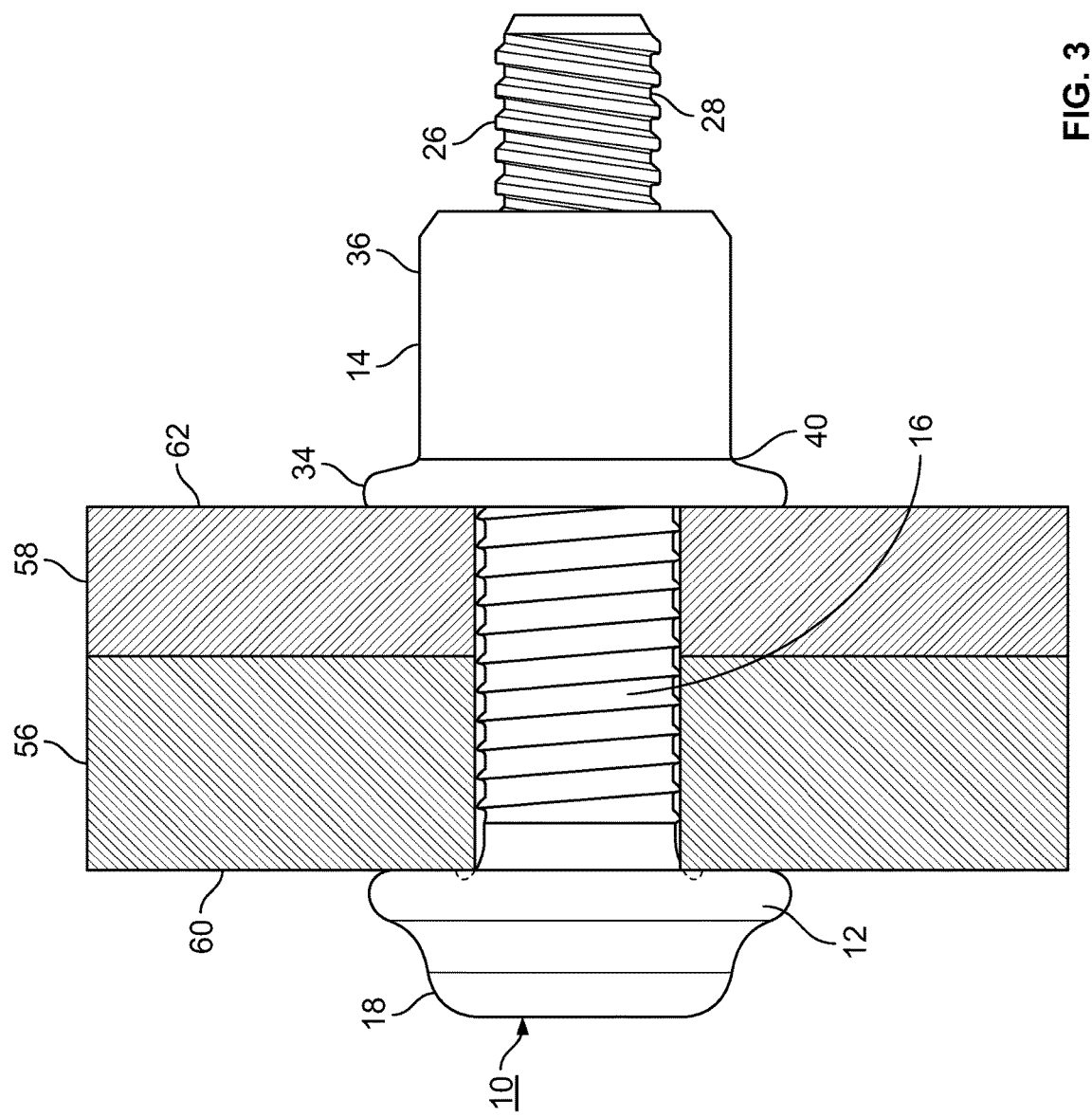
FIG. 3 is a side elevational view of the lockbolt fastening system shown in FIG. 1 installed in aligned holes in a plurality of workpieces which are shown in cross-section.

Referring to FIG. 3, in an embodiment, the swage collar 14 and the pin member 12 are adapted to secure a plurality of workpieces 56, 58 together. In an embodiment, the shank portion 16 of the pin member 12 is inserted through aligned holes of the workpieces 56, 58, with the head 18 abutting one side 60 of the workpiece 56 and the shank portion 16 extending outwardly from one side 62 of the workpiece 58. In an embodiment, the swage collar 14 is fitted on the shank portion 16 of the pin member 12, whereby the shank portion 16 is inserted within the through bore 38 of the collar 14 (as shown in FIG. 2). The swage collar 14 is fitted on the pin member 12 until the flange 36 of the collar 14 abuts the side 62 of the workpiece 58.

In an embodiment, the pull grooves 28 of the pull portion 26 of the pin member 12 are adapted to be gripped by matching teeth of chuck jaws of a fastener installation tool having a swage anvil (not shown in the Figures). In an embodiment, the fastener installation tool may consist of the tools disclosed and described in U.S. Pat. No. 7,293,339 to Mercer et al. In an embodiment, the swage anvil of the tool is adapted to engage the swage collar 14 and apply a relative axial force between the collar 14 and the pin member 12, and to move over the collar 14 and swage it into the lock grooves 24 of the pin member 12 (not shown in the Figures). FIG. 3 shows the collar 14 fully installed on the pin member 12.

Figure 4:
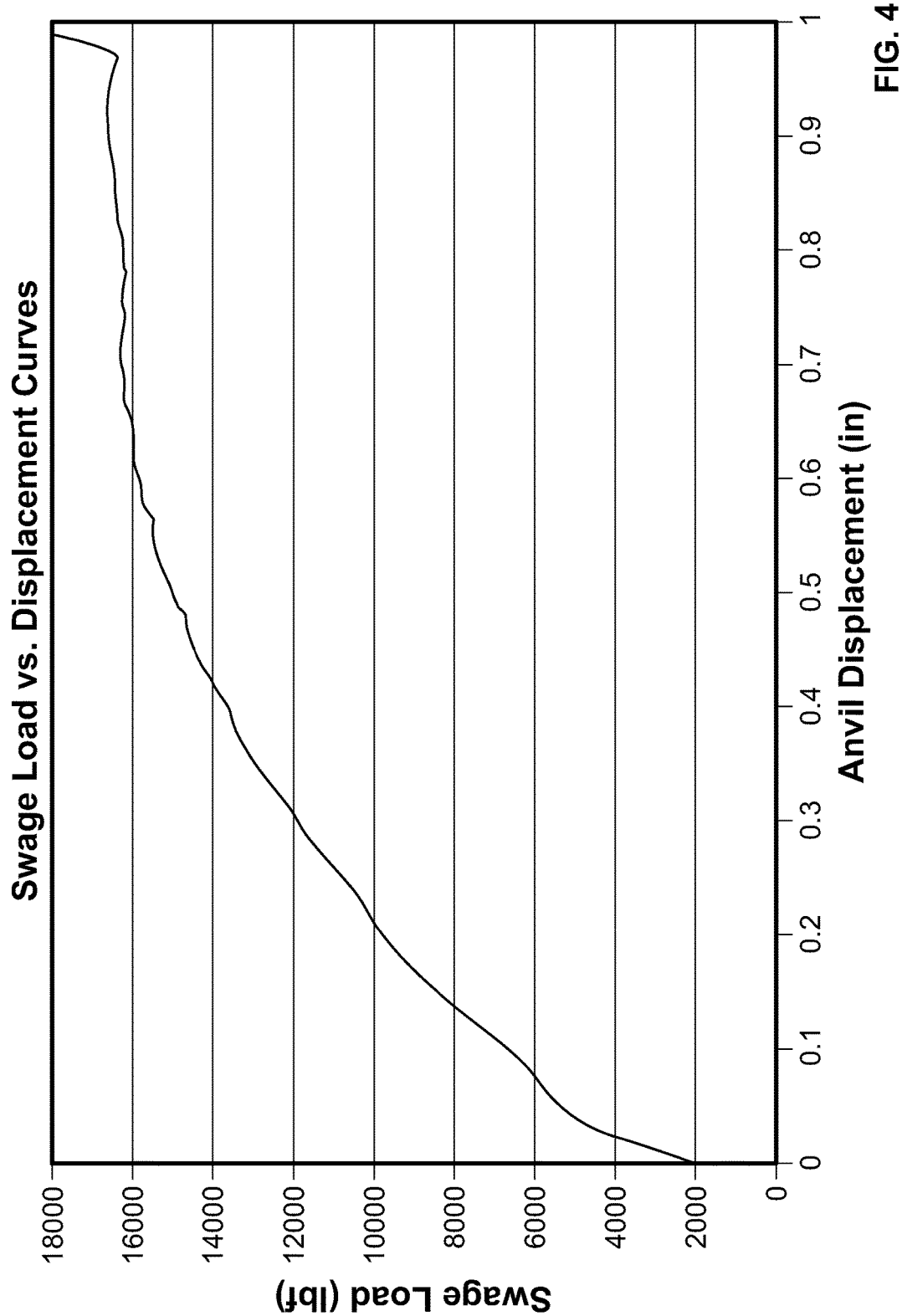
FIG. 4 is a graph showing swage load as plotted against swage anvil displacement during installation of the swage-type lockbolt fastening system shown in FIG. 1.

FIG. 4 shows a graph showing the relationship of the swage load on the exemplary fastener 10 during installation (as shown along the vertical axis) to the displacement of a swage anvil that is swaging the exemplary fastener 10 (as shown along the horizontal axis). It may be seen that the exemplary fastener 10 swages at a relatively constant load throughout the installation thereof.

Figure 5:
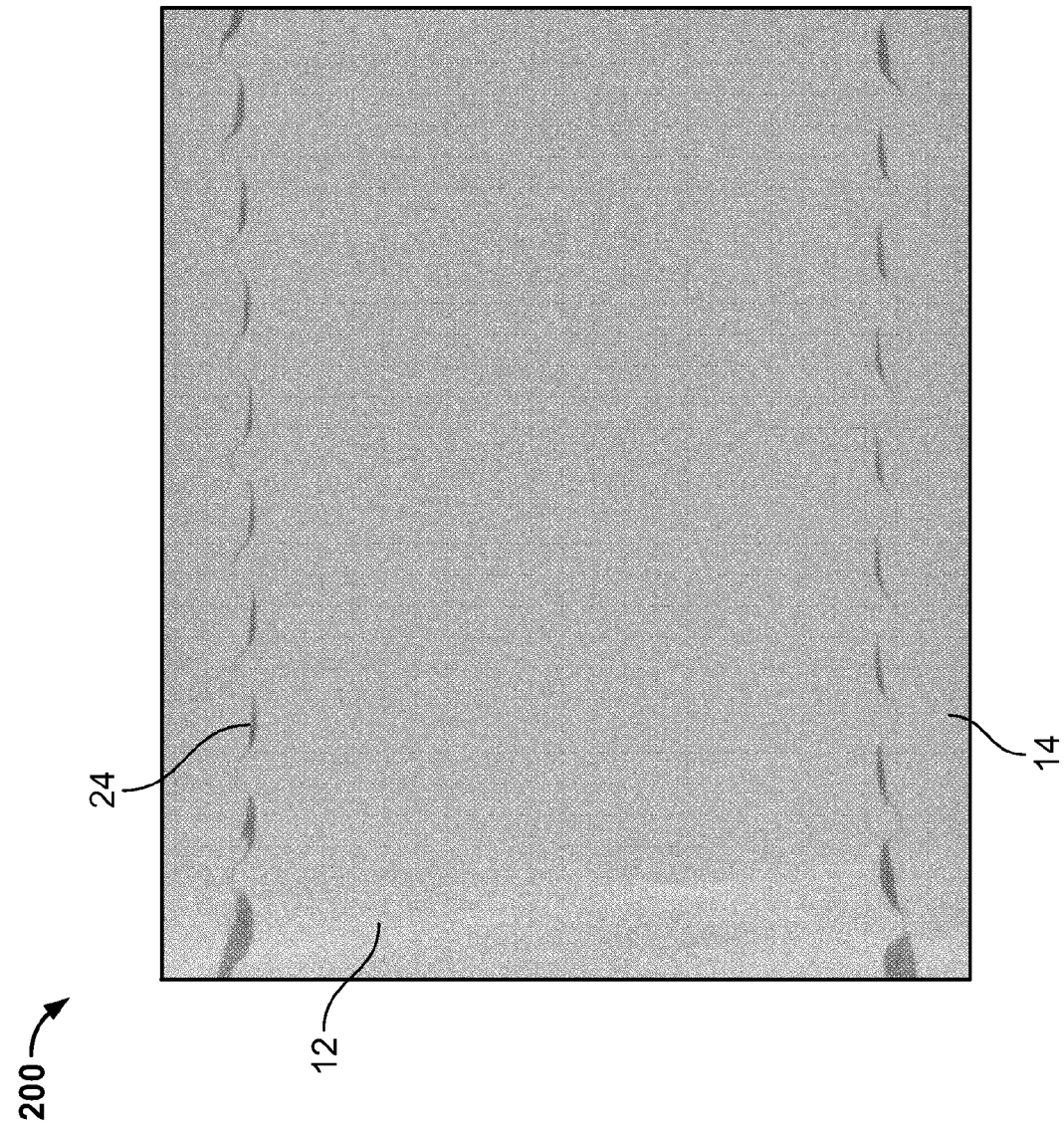
FIG. 5 is a computerized axial tomography ("CAT") scan image showing the lock grooves of a pin member as filled by the material of the exemplary swage collar of FIG. 1 after swaging.

FIG. 5 shows a CAT scan image 200 showing the lock grooves 24 of the pin member 12 as filled by the material of the swage collar 14 after swaging. It is shown that spaces within the lock grooves 24 of the pin member 12 are filled to a fill level of between about 75% and about 90%. The clamp strength and tensile strength of a swage fastener increase as the fill level of the lock grooves increases. Consequently, the exemplary fastener 10 can provide high clamp strength to the fastened workpieces 56, 58. In an embodiment, the exemplary fastener 10 having the pin member 12 that is a class 10.9 strength level bolt can achieve a higher clamp load than that specified by the ASTM International F568M standard for class 10.9 strength level bolts. In an embodiment, the exemplary fastener 10 having the pin member 12 that is a class 10.9 strength level bolt can achieve a clamp load comparable to that specified by the ASTM International F568M standard for class 12.9 strength level bolts. In an embodiment, the exemplary fastener 10 can achieve such a clamp load with the swage collar 14 that is as-headed and not thermally processed. It will be apparent to those of skill in the art that the pin member 12 can have a strength level other than a class 10.9 strength level bolt, and that clamp loads greater than those specified by applicable standards can also be achieved for such bolts as implemented in the exemplary fastener 10 including the swage collar 14.

It should be understood that the embodiments described herein are merely exemplary and that a person skilled in the art may make many variations and modifications without departing from the spirit and scope of the invention. Accordingly, all such variations and modifications are intended to be included within the scope of the embodiments described herein.

What is claimed is:

1. A swage collar, comprising:
   a shank having a first end, a second end opposite the first end, an outside diameter, and an overall length between the first end and the second end;
   a flange extending from the first end of the shank; and
   a through bore extending longitudinally through the shank from the first end of the shank to the second end of the shank, the through bore defining an inside diameter, the inside diameter and the outside diameter together defining a wall thickness of the shank,
   wherein the wall thickness of the shank is in a range of about 0.13 times the overall length of the shank to about 0.14 times the overall length of the shank.

2. The swage collar of claim 1, wherein the swage collar is made from either low-carbon steel or medium-carbon steel.

3. The swage collar of claim 2, wherein the swage collar is as-headed.

4. The swage collar of claim 2, wherein the swage collar is thermally processed.

5. A swage collar, comprising:
   a shank having a first end, a second end opposite the first end, an outside diameter, and an overall length between the first end and the second end of the shank;
   a flange extending from the first end of the shank to a flange endpoint that is located intermediate the first end of the shank and the second end of the shank, the flange endpoint defining a swage length of the shank between the flange endpoint and the second end of the shank; and
   a through bore extending longitudinally through the shank from the first end of the shank to the second end of the shank, the through bore defining an inside diameter, the inside diameter and the outside diameter together defining a wall thickness of the shank,
   wherein the swage length of the shank is in a range of about 6.0 times the wall thickness of the shank to about 7.0 times the wall thickness of the shank.

6. The swage collar of claim 5, wherein the swage length of the shank is a range of from about 6.3 times the wall thickness of the shank to about 6.6 times the wall thickness of the shank.

7. The swage collar of claim 5, wherein the swage collar is made from either low-carbon steel or medium-carbon steel.

8. The swage collar of claim 7, wherein the swage collar is as-headed.

9. The swage collar of claim 7, wherein the swage collar is thermally processed.

10. A fastener, comprising:
    a pin member having an elongated shank portion having a first end and a second end opposite the first end, a head at the first end, a pull portion at the second end, and a plurality of lock grooves intermediate the first and second ends of the shank portion; and
    a swage collar including
        a shank having a first end, a second end opposite the first end of the shank of the swage collar, an outside diameter, and an overall length between the first end of the shank of the swage collar and the second end of the shank of the swage collar,
        a flange extending from the first end of the shank of the swage collar to a flange endpoint intermediate the first and second ends of the shank of the swage collar, the flange endpoint defining a swage length of the shank of the swage collar between the flange endpoint and the second end of the shank of the swage collar,
        and a through bore extending longitudinally through the shank of the swage collar from the first end of the shank of the swage collar to the second end of the shank of the swage collar, the through bore defining an inside diameter, the inside diameter and the outside diameter together defining a wall thickness of the shank of the swage collar,
        wherein the swage length of the shank of the swage collar is in a range of about 6.25 times the wall thickness of the shank of the swage collar to about 6.67 times the wall thickness of the shank of the swage collar.

11. The fastener of claim 10, wherein the shank portion of the pin member includes a threaded portion having a plurality of threads, and wherein the lock grooves are formed by the plurality of threads.

12. The fastener of claim 10, wherein the pin member is a Class 10.9 strength level bolt.

13. The fastener of claim 10, wherein the swage collar is made from either low-carbon steel or medium-carbon steel.

14. The fastener of claim 13, wherein the swage collar is as-headed.

15. The fastener of claim 13, wherein the swage collar is thermally processed.

* * * * *